(12) United States Patent
Konishi (10) Patent No.: US 11,823,414 B2
(45) Date of Patent: Nov. 21, 2023

(54) INFORMATION PROCESSING DEVICE, INFORMATION PROCESSING METHOD, AND INFORMATION PROCESSING NON-TRANSITORY COMPUTER READABLE MEDIUM

(71) Applicant: OMRON Corporation, Kyoto (JP)

(72) Inventor: Yoshinori Konishi, Kyoto (JP)

(73) Assignee: OMRON Corporation, Kyoto (JP)

( * ) Notice: Subject to any disclaimer, the term of this patent is extended or adjusted under 35 U.S.C. 154(b) by 759 days.

(21) Appl. No.: 16/975,389

(22) PCT Filed: Feb. 18, 2019

(86) PCT No.: PCT/JP2019/005762
§ 371 (c)(1),
(2) Date: Aug. 24, 2020

(87) PCT Pub. No.: WO2019/176450
PCT Pub. Date: Sep. 19, 2019

(65) Prior Publication Data
US 2020/0394818 A1 Dec. 17, 2020

(30) Foreign Application Priority Data

Mar. 14, 2018 (JP) ................................ 2018-046664

(51) Int. Cl.
*G06T 7/73* (2017.01)
*B25J 9/16* (2006.01)
(Continued)

(52) U.S. Cl.
CPC .............. *G06T 7/75* (2017.01); *B25J 9/1605* (2013.01); *B25J 9/1697* (2013.01); *G06T 7/74* (2017.01); *G06V 10/751* (2022.01); *G06V 20/64* (2022.01)

(58) Field of Classification Search
CPC ........ B25J 9/1605; B25J 9/1697; B25J 13/08; G06V 20/64; G06V 10/751; G06T 7/74; G06T 7/75
See application file for complete search history.

(56) References Cited

U.S. PATENT DOCUMENTS

2013/0124156 A1\* 5/2013 Wolper .................. G06T 17/00
703/1
2014/0039679 A1 2/2014 Ando
(Continued)

FOREIGN PATENT DOCUMENTS

CN 105654464 6/2016
CN 106182045 12/2016
(Continued)

OTHER PUBLICATIONS

"International Search Report (Form PCT/ISA/210) of PCT/JP2019/005762," dated May 14, 2019, with English translation thereof, pp. 1-2.
(Continued)

*Primary Examiner* — Congvan Tran
(74) *Attorney, Agent, or Firm* — JCIPRNET (57) ABSTRACT

The information processing device includes: a first input unit for generating a three-dimensional model of an object to be recognized; a template generation unit that generates, on the basis of the three-dimensional model information, a two-dimensional template which shows the shape of the upper edge of the object to be recognized; a coordinate relationship identification unit that generates coordinate relationship information indicating the relationship between three-dimensional coordinates of the three-dimensional model and two-dimensional coordinates when the three-dimensional model is imaged; a second input unit that receives the input of the captured image; a matching unit that matches the captured image and the two-dimensional template; and a
(Continued)

recognition unit that recognizes the three-dimensional position and posture of the object to be recognized by referencing the coordinate relationship information, which is detected according to the results of the two-dimensional matching by the matching unit.

3 Claims, 7 Drawing Sheets

(51) Int. Cl.
    *G06V 10/75*      (2022.01)
    *G06V 20/64*      (2022.01)

(56) References Cited

U.S. PATENT DOCUMENTS

| | | | |
|---|---|---|---|
| 2017/0032581 A1* | 2/2017 | Petrucci | G06T 15/00 |
| 2019/0228263 A1* | 7/2019 | Szeto | G02B 27/017 |
| 2019/0272411 A1* | 9/2019 | Zou | G06T 7/10 |

FOREIGN PATENT DOCUMENTS

| | | |
|---|---|---|
| CN | 106355614 | 1/2017 |
| CN | 107030520 X | 8/2017 |
| JP | 2007333679 | 12/2007 |
| JP | 5429614 | 2/2014 |
| JP | 2014028415 | 2/2014 |

OTHER PUBLICATIONS

"Written Opinion of the International Searching Authority (Form PCT/ISA/237) of PCT/JP2019/005762," datedMay 14, 2019, with English translation thereof, pp. 1-8.

Dirk Holz et al., "Fast Edge-Based Detection and Localization of Transport Boxes and Pallets in RGB-D Images for Mobile Robot Bin Picking", Proceedings of ISR 2016: 47st International Symposium on Robotics, Jun. 22, 2016, pp. 133-140.

Office Action of China Counterpart Application, with English translation thereof, dated May 29, 2023, pp. 1-16.

Dirk Holz et al., "Fast Edge-Based Detection and Localization of Transport Boxes and Pallets in RGB-D Images for Mobile Robot Bin Picking," 47st International Symposium on Robotics, Jun. 2016, pp. 1-8.

"Search Report of Europe Counterpart Application", dated Nov. 15, 2021, p. 1-p. 7.

* cited by examiner

FIG. 9

INFORMATION PROCESSING DEVICE, INFORMATION PROCESSING METHOD, AND INFORMATION PROCESSING NON-TRANSITORY COMPUTER READABLE MEDIUM

CROSS-REFERENCE TO RELATED APPLICATION

This application is a 371 application of the International PCT application serial no. PCT/JP2019/005762, filed on Feb. 18, 2019, which claims the priority benefits of Japan Patent Application No. 2018-046664, filed on Mar. 14, 2018. The entirety of each of the above-mentioned patent applications is hereby incorporated by reference herein and made a part of this specification.

TECHNICAL FIELD

The present invention relates to an information processing device, an information processing method, and a program.

BACKGROUND ART

In recent years, industrial robots that capture an image of an object using a camera or the like, determine the position of a member in accordance with the imaging results, and then perform operations such as grasping or assembling the object with an arm have become widespread. Here, for example, in an assembly factory or the like, a large number of members of one kind are often transported or the like while packed in a box-shaped member called a container. In order to perform an operation such as lifting members contained in a container with an arm of an industrial robot, it is necessary to perform control so that the arm does not touch the edge of the container.

For example, Patent Literature 1 discloses that a plurality of box-shaped arms is imaged from information to acquire the whole image and detect the edge portion of a box-shaped workpiece, and the three-dimensional shape of a plurality of box-shaped workpieces is measured as a point group by a distance sensor. In the method, point group information on measurement points obtained by the distance sensor is extracted, and the position and posture of each box-shaped workpiece are recognized from its three-dimensional shape on the basis of the point group information.

CITATION LIST

Patent Literature

[Patent Literature 1]
Japanese Patent 5429614

SUMMARY OF INVENTION

Technical Problem

Here, a container which is an object having members contained therein generally has a thin edge. In a case where the edge is thin, it is difficult to acquire three-dimensional point group information using the distance sensor as disclosed in Patent Literature 1 for reasons of reflection of irradiation light not being likely to be obtained at the edge of a box-shaped workpiece. For example, when an industrial robot fails to recognize a container, inconvenience such as the arm of the industrial robot touching the edge of the container may occur.

Several aspects of the present invention were contrived in view of the aforementioned problem, and one objective of the invention is to provide an information processing device, an information processing method, and a program that make it possible to recognize a three-dimensional position/posture with a high degree of accuracy.

Solution to Problem

According to an aspect of the present invention, there is provided an information processing device including: a first input unit that receives an input of three-dimensional model information for generating a three-dimensional model of an object to be recognized; a template generation unit that generates a two-dimensional template which shows a shape of an upper edge of the object to be recognized on the basis of the three-dimensional model information; a coordinate relationship identification unit that generates coordinate relationship information indicating a relationship between three-dimensional coordinates of the three-dimensional model and two-dimensional coordinates when the three-dimensional model is imaged; a second input unit that receives an input of a captured image obtained by capturing an image of the object to be recognized; a matching unit that matches the captured image with the two-dimensional template; and a recognition unit that recognizes a three-dimensional position and posture of the object to be recognized by referencing the coordinate relationship information with respect to the object to be recognized in the captured image which is detected according to two-dimensional matching results of the matching unit.

In the configuration, a two-dimensional template is generated, and the three-dimensional position and posture of an object to be recognized is detected in accordance with matching of a captured image with the two-dimensional template. Although it is difficult to measure the three-dimensional coordinates of an object having a small width or an object formed of a specular light-reflective material, the three-dimensional position and posture of an object to be recognized are detected on the basis of a matching process in two dimensions, and thus it is possible to recognize the posture/position of an object to be recognized with a high degree of accuracy. Thereby, for example, in a case where an information processing device according to the configuration is applied to the recognition of the posture/position of the container which is an object to be recognized by an industrial robot having an arm, it is possible to prevent a situation such as damage to the robot arm and/or the container which is associated with the collision of the robot arm with the container.

According to an aspect of the present invention, there is provided an information processing method including causing an information processing device to perform: a process of receiving an input of three-dimensional model information for generating a three-dimensional model of an object to be recognized; a process of generating a two-dimensional template which shows a shape of an upper edge of the object to be recognized on the basis of three-dimensional model information; a process of generating coordinate relationship information indicating a relationship between three-dimensional coordinates of the three-dimensional model and two-dimensional coordinates when the three-dimensional model is imaged; a process of receiving an input of a captured image obtained by capturing an image of the object to be recognized; a process of matching the captured image with the two-dimensional template; and a process of recognizing a three-dimensional position and posture of the object to be recognized by referencing the coordinate relationship information with respect to the object to be recognized in the captured image which is detected according to two-dimensional matching results.

In the configuration, a two-dimensional template is generated, and the three-dimensional position and posture of an object to be recognized is detected in accordance with matching of a captured image with the two-dimensional template. Although it is difficult to measure the three-dimensional coordinates of an object having a small width or an object formed of a specular light-reflective material, the three-dimensional position and posture of an object to be recognized are detected on the basis of a matching process in two dimensions, and thus it is possible to recognize the posture/position of an object to be recognized with a high degree of accuracy. Thereby, for example, in a case where the information processing method according to the configuration is applied to the recognition of the posture/position of the container which is an object to be recognized by an industrial robot having an arm, it is possible to prevent a situation such as damage to the robot arm and/or the container which is associated with the collision of the robot arm with the container.

According to an aspect of the present invention, there is provided a program for causing an information processing device to execute: a process of receiving an input of three-dimensional model information for generating a three-dimensional model of an object to be recognized; a process of generating a two-dimensional template which shows a shape of an upper edge of the object to be recognized on the basis of three-dimensional model information; a process of generating coordinate relationship information indicating a relationship between three-dimensional coordinates of the three-dimensional model and two-dimensional coordinates when the three-dimensional model is imaged; a process of receiving an input of a captured image obtained by capturing an image of the object to be recognized; a process of matching the captured image with the two-dimensional template; and a process of recognizing a three-dimensional position and posture of the object to be recognized by referencing the coordinate relationship information with respect to the object to be recognized in the captured image which is detected according to two-dimensional matching results.

In the configuration, a two-dimensional template is generated, and the three-dimensional position and posture of an object to be recognized is detected in accordance with matching of a captured image with the two-dimensional template. Although it is difficult to measure the three-dimensional coordinates of an object having a small width or an object formed of a specular light-reflective material, the three-dimensional position and posture of an object to be recognized are detected on the basis of a matching process in two dimensions, and thus it is possible to recognize the posture/position of an object to be recognized with a high degree of accuracy. Thereby, for example, in a case where the program according to the configuration is applied to the recognition of the posture/position of the container which is an object to be recognized by an industrial robot having an arm, it is possible to prevent a situation such as damage to the robot arm and/or the container which is associated with the collision of the robot arm with the container.

Meanwhile, in the present invention, "unit," "means," "device," and "system" do not simply mean physical means, and the functions of "unit," "means," "device," and "system" may be realized by software. In addition, the function of each one of "unit," "means," "device," and "system" may be realized by two or more physical means or devices, and the functions of each two or more of "units," "means," "device," and "system" may be realized by one physical means of device.

DESCRIPTION OF EMBODIMENTS

Hereinafter, an embodiment of the present invention will be described with reference to the accompanying drawings. Incidentally, the embodiment to be described below is just for illustration, and is not intended to exclude applications of various modifications or techniques which are not explicitly specified below. That is, the present invention can be carried out in various modified forms without departing from the scope of the invention. In addition, in the following description of the drawings, the same or similar portions are denoted by the same or similar reference numerals and signs. The drawings are schematic illustrations, and the dimensions, ratios and the like shown in the drawings do not necessarily match those in reality. There may also be portions in which mutual dimensional relationships or ratios are shown differently between the drawings.

1 Application Example

First, the whole outline according to the embodiment will be described with reference to FIGS. 1 to 4. An information processing device according to the present embodiment can be used for, for example, recognizing the three-dimensional position/posture of a container or the like that contains members which are objects to be operated by an industrial robot having an arm. In a case where the three-dimensional position/posture of the container can be recognized with a high degree of accuracy, an industrial robot can control its arm not to collide with the container, and thus it is possible to prevent damage due to a collision of the arm and/or the container. Meanwhile, although objects to be recognized of which the three-dimensional positions/postures are recognized by the information processing device according to the embodiment are not limited to the container, a description will be given below with a focus on the container.

The information processing device generates a two-dimensional template which shows the shape of the upper edge of the container in advance, and then detects the upper edge of the container by performing two-dimensional template matching on a two-dimensional image including the container captured by a camera rather than three-dimensional information based on a distance sensor or the like. As will be described below, processing of the information processing device according to the present embodiment includes a process of generating a two-dimensional template and a process of recognizing a three-dimensional position/posture using the generated two-dimensional template. Hereinafter, the two processes will be described.

1.1 Two-Dimensional Template Generation Process

Figure 1:
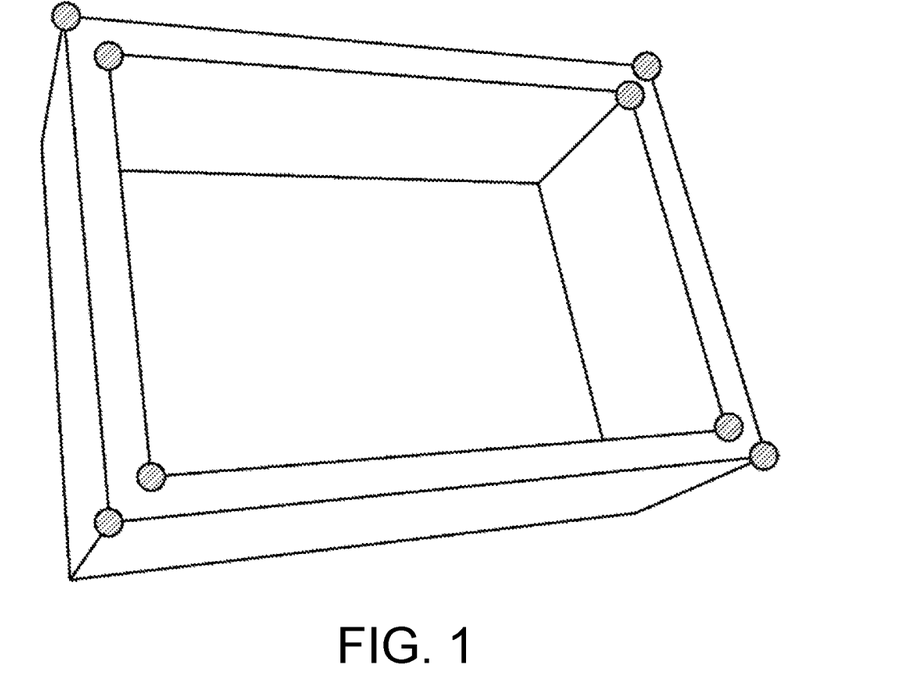
FIG. 1 is a diagram illustrating an example of processing of an information processing device according to an embodiment.
Figure 2:
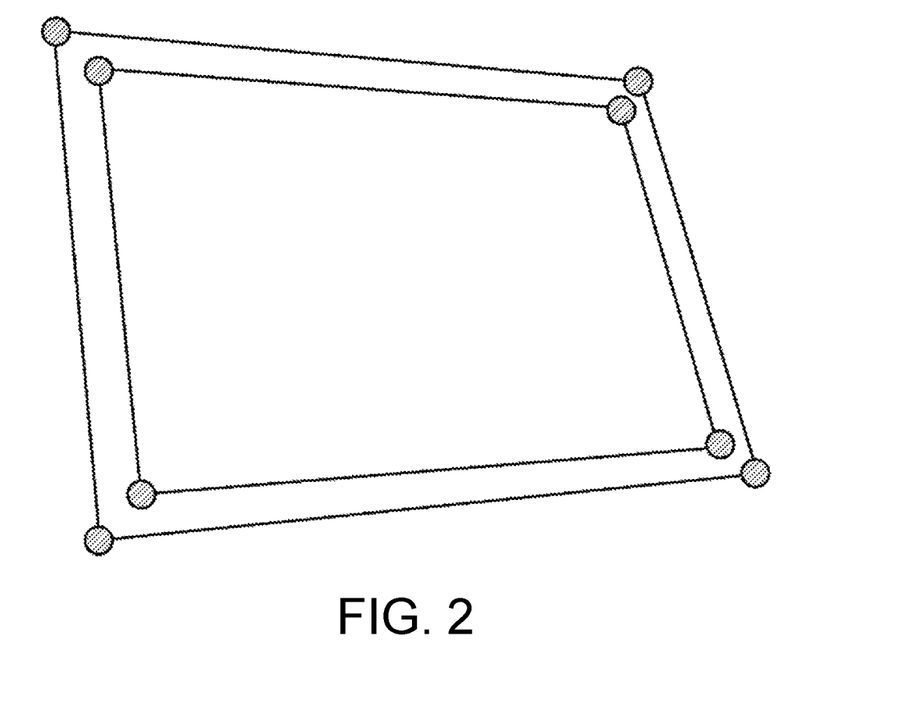
FIG. 2 is a diagram illustrating an example of processing of the information processing device according to the embodiment.

Hereinafter, a process of generating a two-dimensional template will be described with reference to FIGS. 1 and 2. The information processing device first receives an input of three-dimensional CAD information relating to a three-dimensional model of the container, and analyzes the CAD information. Thereby, by specifying where the upper edge of the three-dimensional model of the container is as shown in FIG. 1, and then extracting feature points of the upper edge or the like, a two-dimensional template image which is a binarized two-dimensional image showing the shape of the upper edge of the three-dimensional model of the container, as shown in FIG. 2, is generated. The two-dimensional template image generated in this case is equivalent to an upper edge image obtained by capturing an image of the upper edge of the three-dimensional model of the container when a virtual camera and the three-dimensional model of the container are disposed within a virtual space.

In addition, the information processing device extracts feature points including portions other than the upper edge from the three-dimensional model of the container, and then specifies where these feature points are located in a two-dimensional image captured from the virtual camera disposed within the virtual space. Thereby, a correspondence relation between three-dimensional coordinates of the three-dimensional model of the container and two-dimensional coordinates on the two-dimensional image captured by the virtual camera is stored. Meanwhile, the correspondence relation is equivalent to coordinate relationship information to be described later.

Meanwhile, in FIGS. 1 and 2, a square container is shown, but there is no limitation thereto, and a round container, a container having partitions therein, or the like can also be considered as a target for processing.

1.2 Recognition Process

Figure 3:
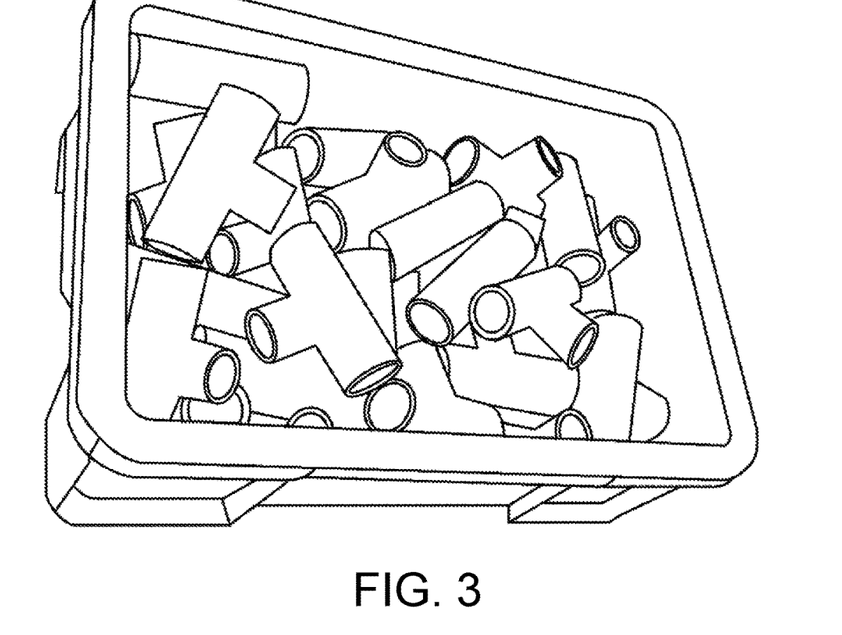
FIG. 3 is a diagram illustrating an example of processing of an information processing device according to the embodiment.
Figure 4:
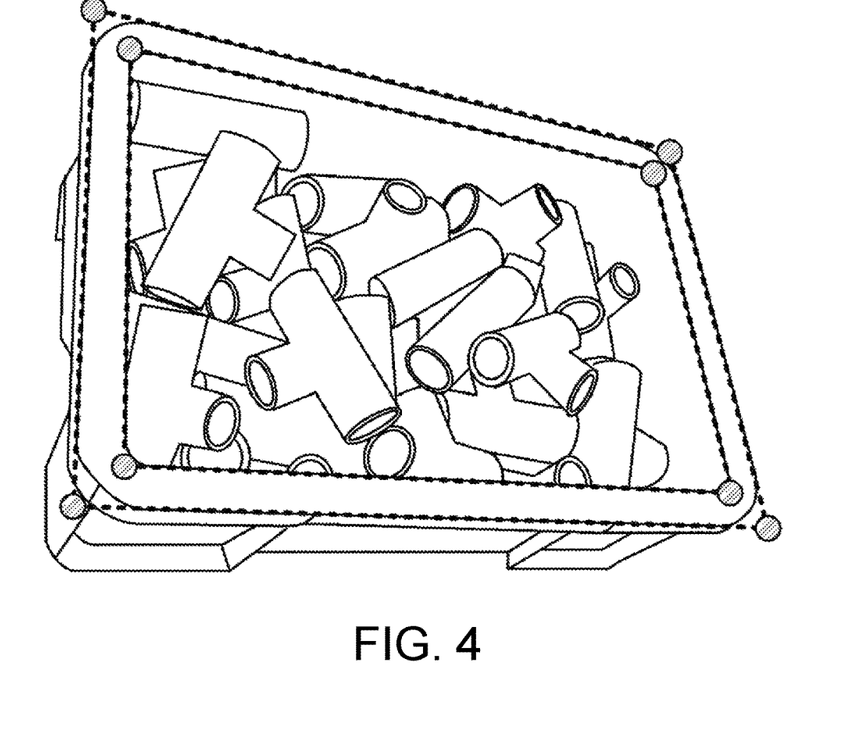
FIG. 4 is a diagram illustrating an example of processing of an information processing device according to the embodiment.

Next, processing of a two-dimensional captured image captured by a camera or the like in the actual environment will be described with reference to FIGS. 3 and 4. In a case where an input of a captured image as shown in FIG. 3 is received from a camera, the information processing device transforms the captured image into a luminance image (or, the input may also be used as a luminance image), and then performs matching with a two-dimensional template generated in advance as shown in FIG. 4. Thereby, the information processing device can recognize at which position on the captured image (x, y coordinates) and at what rotation angle a container equivalent to a three-dimensional model from which the two-dimensional template is generated is disposed. Further, the information processing device specifies the positions of the feature points on the captured image with the matched two-dimensional template as a reference. The three-dimensional position/posture of the container is recognized by transforming these positions of feature points using the above-described coordinate relationship information.

2 Configuration Example

Figure 5:
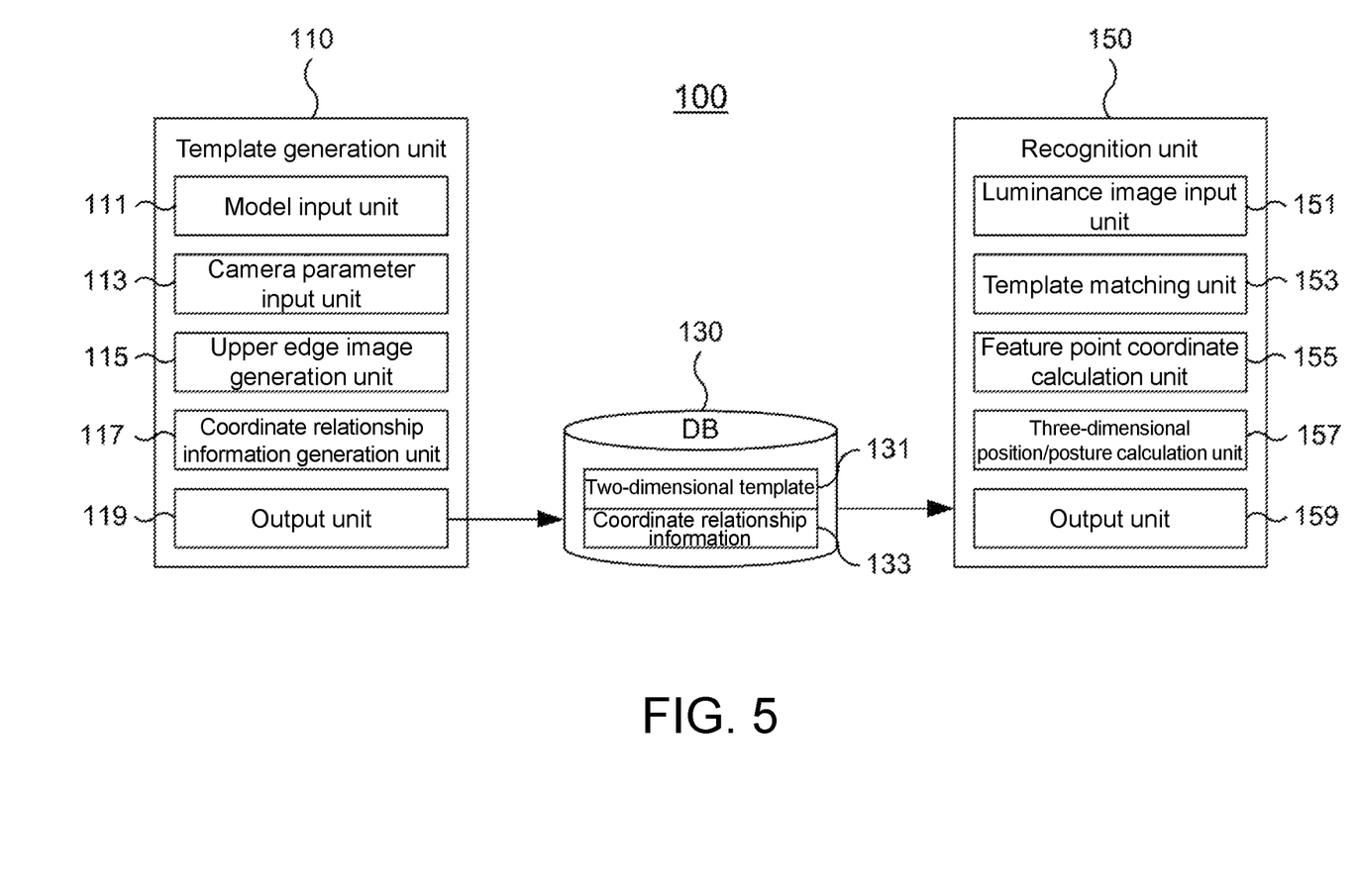
FIG. 5 is a diagram schematically illustrating an example of a configuration of the information processing device according to the embodiment.

Hereinafter, an operation configuration example of an information processing device 100 according to the present embodiment will be described with reference to FIG. 5. The information processing device 100 generally includes a template generation unit 110, a database (DB) 130, and a recognition unit 150. Meanwhile, each of these configurations may be realized as a program operating on a processor, or may be realized as hardware such as one or a plurality of semiconductors for exclusive use. In addition, the information processing device 100 may also be realized as one computer or the like physically, or may be realized as a plurality of computers or the like physically. For example, the template generation unit 110 and the recognition unit 150 can be realized by separate computers. Operations of a hardware configuration or a program in a case where the template generation unit 110 or the recognition unit 150 is realized as a program will be described later with reference to FIG. 9.

The template generation unit 110 includes a model input unit 111, a camera parameter input unit 113, an upper edge image generation unit 115, a coordinate relationship information generation unit 117, and an output unit 119.

The model input unit 111 receives an input of a three-dimensional CAD model of the container. Alternatively, each dimension value of the container may be input instead of the three-dimensional CAD model. Here, the model input unit 111 is an example of a "first input unit" of the present invention. The three-dimensional CAD model and each dimension value of the container are an example of "three-dimensional model information" of the present invention. Meanwhile, a CAD model of the container in which an input is received by the model input unit 111 or a model of the container which is generated from the dimension values is referred to as a "three-dimensional container model" collectively.

The camera parameter input unit 113 receives an input of camera parameters relating to a virtual camera that captures an image of three-dimensional container model in a virtual space in which the three-dimensional container model is disposed. The camera parameters can include information such as the relative position, direction, or angle of view of the virtual camera for the three-dimensional container model. In this case, the camera parameters may be set in accordance with the position, direction or the like of an actual environment camera which is disposed in order to capture a luminance image used when the recognition unit 150 recognizes the three-dimensional position/posture of the container. As described above, the information processing device 100 generates a two-dimensional template 131 by transforming an upper edge image which is a result obtained by capturing an image of the upper edge of the three-dimensional container model using the virtual camera. The information processing device 100 matches a captured image (equivalent to a luminance image to be described later) in the actual environment with the two-dimensional template 131 thereon. In a case where the position, angle or the like of the virtual camera used when the two-dimensional template 131 is generated and the position, angle or the like of a camera when a captured image in the actual environment is captured are made to substantially coincide with each other, the captured image and the two-dimensional template can be matched using the two-dimensional template generated by the template generation unit 110 as it is. The relative position or posture of a camera to a container in the actual environment can be calculated by placing markers with known spacing on a plane where the container is installed, and recognizing the markers on an image captured by an actual environment camera. By using the calculated relative position/posture of the actual environment camera and the three-dimensional model of the container, it is possible to create an image obtained by projecting any plane of a space including the container to the camera.

Meanwhile, in a case where the position, direction or the like of the virtual camera (camera parameters) used when the two-dimensional template 131 is generated is set to be different from the position or direction of the camera in the actual environment, the luminance image and/or the two-dimensional template 131 which is input to the recognition unit 150 may be transformed on the basis of relative information on the position of the virtual camera used for the template generation unit 110 to generate the two-dimensional template 131 and the position or angle of the camera used to capture the luminance image which is input to the recognition unit 150. Processing in a case where the luminance image and/or the two-dimensional template 131 is transformed in accordance with the relative relation of the camera will be described later with reference to FIG. 8.

The upper edge image generation unit 115 generates an image equivalent to the upper edge of the container (hereinafter referred to as an "upper edge image") in a case where an image of the three-dimensional container model is captured in a virtual space by the virtual camera of which the position or the like is set by camera parameters. More specifically, the upper edge image generation unit 115 first specifies where the upper edge of the three-dimensional container model is according to the normal direction and height of a mesh constituting the three-dimensional container model. For example, among meshes constituting the three-dimensional container model, a portion in which the normal line is directed substantially in a vertical direction (directed at least in an upward direction rather than in a horizontal direction), and which is higher than surrounding meshes can be specified as an upper edge. After the upper edge is specified, the upper edge image generation unit 115 generates an upper edge image which is assumed to be generated in a case where an image of the upper edge is captured from the virtual camera of which the position or the like is specified by camera parameters. An example of generation of the upper edge image is as shown in FIG. 2. The upper edge image generation unit 115 further generates the two-dimensional template 131 for specifying the upper edge from the two-dimensional image captured in the actual environment by performing binarization and edge extraction on the upper edge image according to luminance. Meanwhile, the two-dimensional template 131 may not necessarily have binarization and edge extraction performed thereon, but it is possible to achieve a decrease in the amount of information of the two-dimensional template 131 by performing such a process and a reduction in the amount of calculation in a matching process using this. Here, the upper edge image generation unit 115 is an example of "template generation unit" of the present invention.

Meanwhile, the upper edge image generation unit 115 may transform the two-dimensional template 131 or its original upper edge image in accordance with the direction of the virtual camera specified by camera parameters and/or the direction of the camera used to capture the luminance image in the actual environment.

The coordinate relationship information generation unit 117 extracts a plurality of feature points from the three-dimensional container model, and then specifies a relationship between three-dimensional coordinates in the virtual space and two-dimensional coordinates on the upper edge image in a case where an image of each of the plurality of feature points of the three-dimensional container model is captured by the virtual camera of which the position or the like is specified by camera parameters. The coordinate relationship information generation unit 117 generates coordinate relationship information 133 indicating the specified relationship (relationship between three-dimensional coordinates and two-dimensional coordinates of each feature point).

The output unit 119 outputs the two-dimensional template 131 generated by the upper edge image generation unit 115 and the coordinate relationship information 133 generated by the coordinate relationship information generation unit 117, as the DB 130, to any storage medium.

The recognition unit 150 includes a luminance image input unit 151, a template matching unit 153, a feature point coordinate calculation unit 155, a three-dimensional position/posture calculation unit 157, and an output unit 159.

The luminance image input unit 151 receives an input of a luminance image obtained by capturing an image of a container of which the three-dimensional position/posture is desired to be specified in the actual environment. Here, the luminance image input unit 151 is an example of a "second input unit" of the present invention.

The template matching unit 153 specifies a position equivalent to the upper edge of the container in the luminance image by performing matching with the two-dimensional template 131 on the luminance image which is input from the luminance image input unit 151. Thereby, it is possible to specify at which position (x, y) and at what angle the upper edge of the container is disposed in the luminance image. Meanwhile, in this case, the template matching unit 153 may perform detailed alignment through an iterative closest point (ICP) process after template matching. Here, the template matching unit 153 is an example of a "matching unit" of the present invention.

The feature point coordinate calculation unit 155 specifies the positions (coordinates) of the feature points of the container in the luminance image with the position and angle of the upper edge of the container specified by the template matching unit 153 as a reference.

The three-dimensional position/posture calculation unit 157 obtains the three-dimensional coordinates of each feature point of the container on the basis of the coordinates of the feature points calculated by the feature point coordinate calculation unit 155 and the coordinate relationship information 133. Thereby, the three-dimensional position/posture calculation unit 157 can recognize the position and posture of the container in the real space which is captured in the luminance image. Here, the three-dimensional position/posture calculation unit 157 is an example of a "recognition unit" of the present invention.

The output unit 159 outputs three-dimensional position/posture information indicating the position and posture of the container calculated by the three-dimensional position/posture calculation unit 157. For example, in a case where an industrial robot receives an input of the three-dimensional position/posture information, the position and posture of the container is specified in accordance with the information, and then members placed inside the container can be picked up or the like while control is performed so that its arm does not collide with the container.

3 Flow of Process

Figure 6:
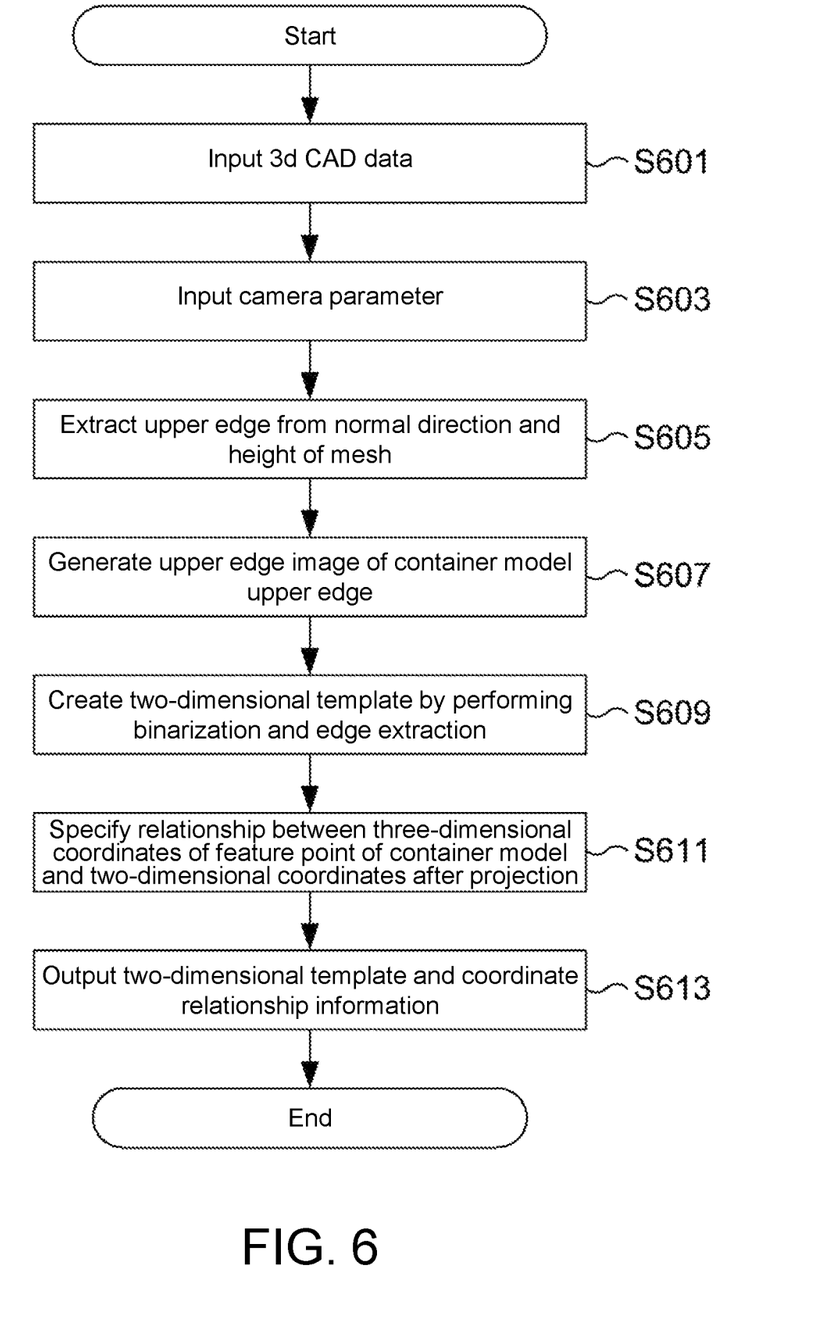
FIG. 6 is a flow chart illustrating an example of a processing procedure of the information processing device according to the embodiment.
Figure 7:
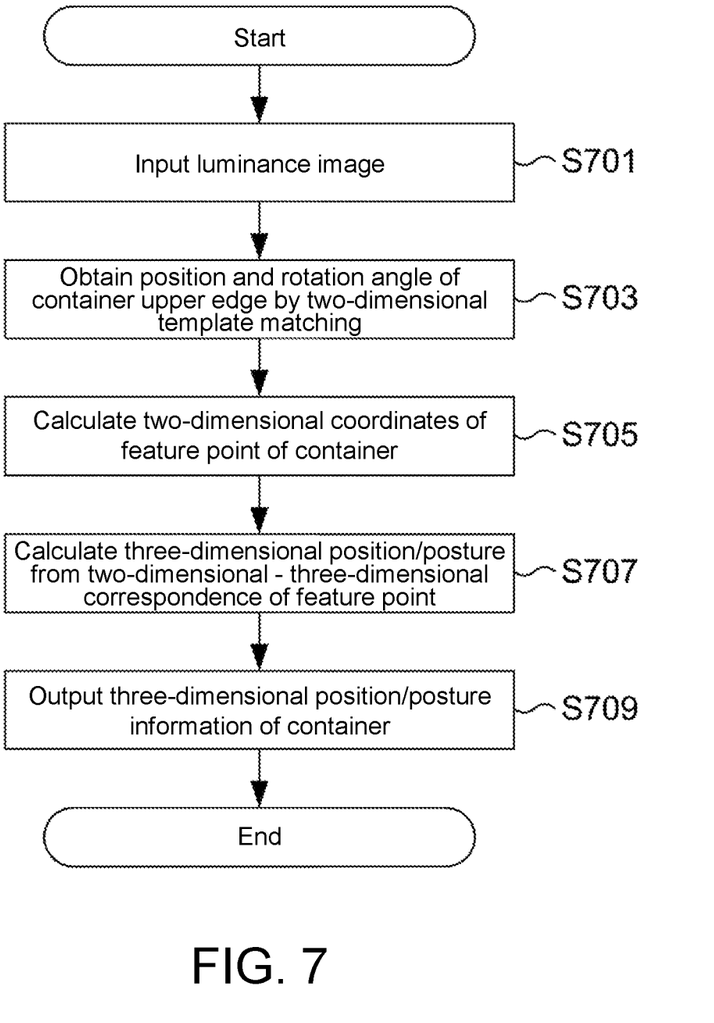
FIG. 7 is a flow chart illustrating an example of a processing procedure of the information processing device according to the embodiment.

Subsequently, a flow of processing the information processing device 100 according to Configuration Example 1 will be described with reference to FIGS. 6 and 7. FIGS. 6 and 7 are flow charts illustrating a flow of processing of the information processing device 100.

Meanwhile, processing steps to be described later may be executed any modified order or in parallel unless conflict occurs in processing details. In addition, another step may be added between the processing steps and be executed. Further, a step described as one step for convenience may be executed by division into a plurality of steps, and steps described by division into a plurality of steps for convenience may be executed as one step. In this point, the same is true of a flow chart of FIG. 8 to be described later.

3.1 Generation of Two-Dimensional Template

First, a flow of processing of template generation which is performed by the template generation unit 110 will be described with reference to FIG. 6.

The model input unit 111 of the template generation unit 110 receives an input of the three-dimensional CAD model (S601). As described above, the model input unit 111 may receive an input of dimension values of the containers instead of the three-dimensional CAD model. The camera parameter input unit 113 receives an input of camera parameters for determining the position, direction, angle of view, or the like of the virtual camera that captures an image of the three-dimensional container model in order to generate the two-dimensional template 131 (S603).

The upper edge image generation unit 115 first specifies a portion equivalent to an upper edge from the normal direction and height of a mesh constituting the three-dimensional container model with respect to the three-dimensional container model received as an input by the model input unit (S605). As described above, the upper edge image generation unit 115 can specify, for example, a portion in which the normal line of a mesh constituting the three-dimensional container model is directed at least in an upward direction rather than in a horizontal direction and which is higher than surrounding meshes as an upper edge.

In addition, the upper edge image generation unit 115 generates an upper edge image equivalent to an imaging result in a case where an image of the upper edge of the three-dimensional container model is captured by the virtual camera of which the position or the like is specified by camera parameters (S607).

Further, the upper edge image generation unit 115 generates the two-dimensional template 131 for detecting the upper edge of the container from the two-dimensional captured image by performing binarization, edge extraction and the like on the upper edge image (S609).

The coordinate relationship information generation unit 117 extracts a plurality of feature points from the three-dimensional container model, and then generates the coordinate relationship information 133 indicating a relationship between the coordinates of each of the plurality of feature points in a three-dimensional virtual space and the two-dimensional coordinates of the feature point on the upper edge image (S611).

The output unit 119 outputs the two-dimensional template 131 and the coordinate relationship information 133 which are generated in S609 and S611 to any storage medium (S613).

3.2 Recognition Process of Position/Posture

Subsequently, a flow of a recognition process of the three-dimensional position/posture of the container for a luminance image obtained by capturing an image of the container which is performed by the recognition unit 150 will be described with reference to FIG. 7.

First, the luminance image input unit 151 receives an input of a luminance image obtained by capturing an image of a container (S701). The template matching unit 153 specifies the position and rotation angle of the upper edge of the container within the luminance image by matching the luminance image with the two-dimensional template of the container prepared in advance (S703). Then, the feature point coordinate calculation unit 155 calculates the two-dimensional coordinates of the feature point of the container in the luminance image with the upper edge of the container specified by the template matching unit 153 as a reference (S705).

The three-dimensional position/posture calculation unit 157 generates the three-dimensional coordinates of each feature point by transforming the two-dimensional coordinates of each feature point in the luminance image specified in S705 using the coordinate relationship information 133 (S707). Thereby, the three-dimensional position/posture calculation unit 157 recognizes the position and posture of the container in the real space which is captured in the luminance image.

The output unit 159 outputs position/posture information indicating the calculated position and posture of the container to the outside (S709).

3.3 Modification Example

Meanwhile, in the processing described with reference to FIGS. 6 and 7, a description has been given with a focus on a case in which the imaging position, direction or the like of the virtual camera specified by camera parameters for generating the two-dimensional template from the three-dimensional container model and the imaging position, direction or the like of the camera in the actual environment are made to be substantially coincident with each other, but there is no limitation thereto. For example, in a case where a relative relation between the position, direction or the like of the virtual camera that capture the two-dimensional template image and the position, direction or the like of the camera that captures an image of the container in the actual environment is known, transforming and then processing an image on the basis of the relation can also be considered.

For example, capturing an image of the three-dimensional container model from directly above using the virtual camera to generate the two-dimensional template, and then performing a recognition process on the luminance image obtained by capturing an image of the container from a direction other than directly above can also be considered. Processing in this case will be described with reference to FIG. 8.

Figure 8:
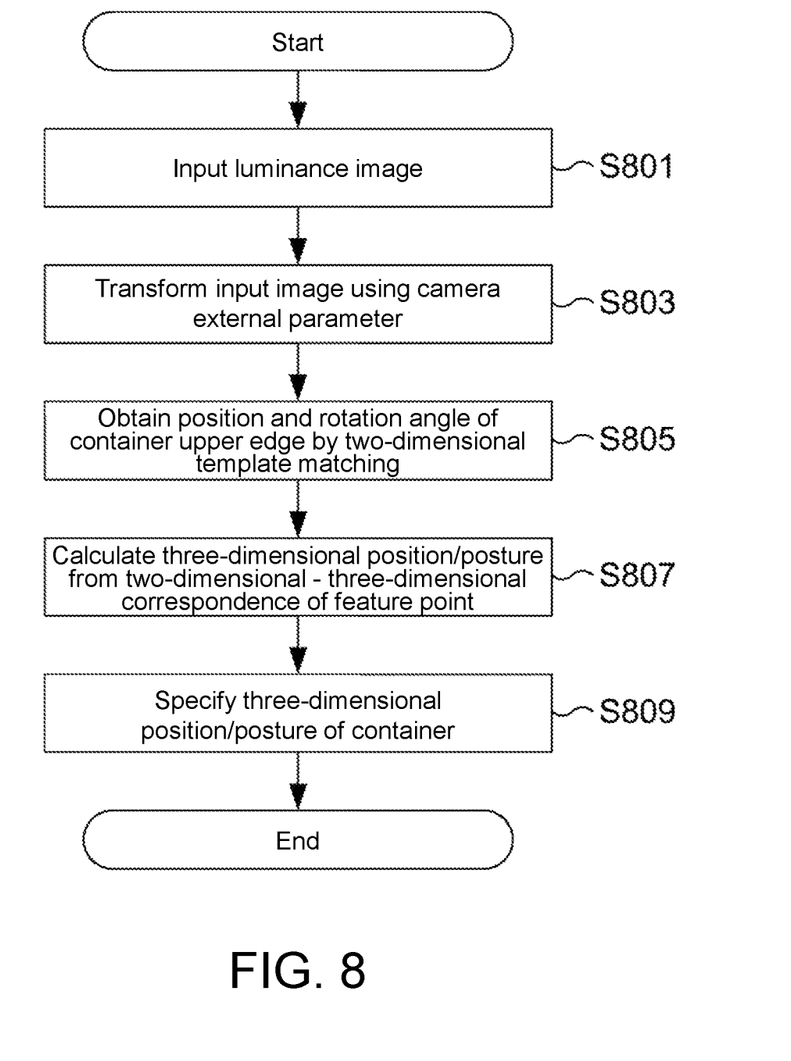
FIG. 8 is a flow chart illustrating an example of a processing procedure of the information processing device according to the embodiment.

The luminance image input unit 151 receives an input of the luminance image obtained by capturing an image of the container (S801). In this case, the luminance image input unit 151 transforms the input luminance image in accordance with a relative relation (camera external parameters) between the position, direction and the like of the virtual camera used when the two-dimensional template 131 is generated and the position, direction and the like of the camera used to capture the luminance image (S803). As a method of the transformation process, for example, plane projective transformation (homography transformation) or the like can be considered. Here, it is assumed to be transformed into an image in a case where an image of the container is captured from directly above. In addition, the plane projective transformation parameter can be calculated from the virtual camera external parameters.

The template matching unit 153 performs matching between the input luminance image after the transformation and the two-dimensional template 131 to specify the position and rotation angle of the upper edge of the container within the input image after the transformation (S805). The processes of S807 and S809 are the same as the processes of S707 and S709 described with reference to FIG. 7.

4 Hardware Configuration

Figure 9:
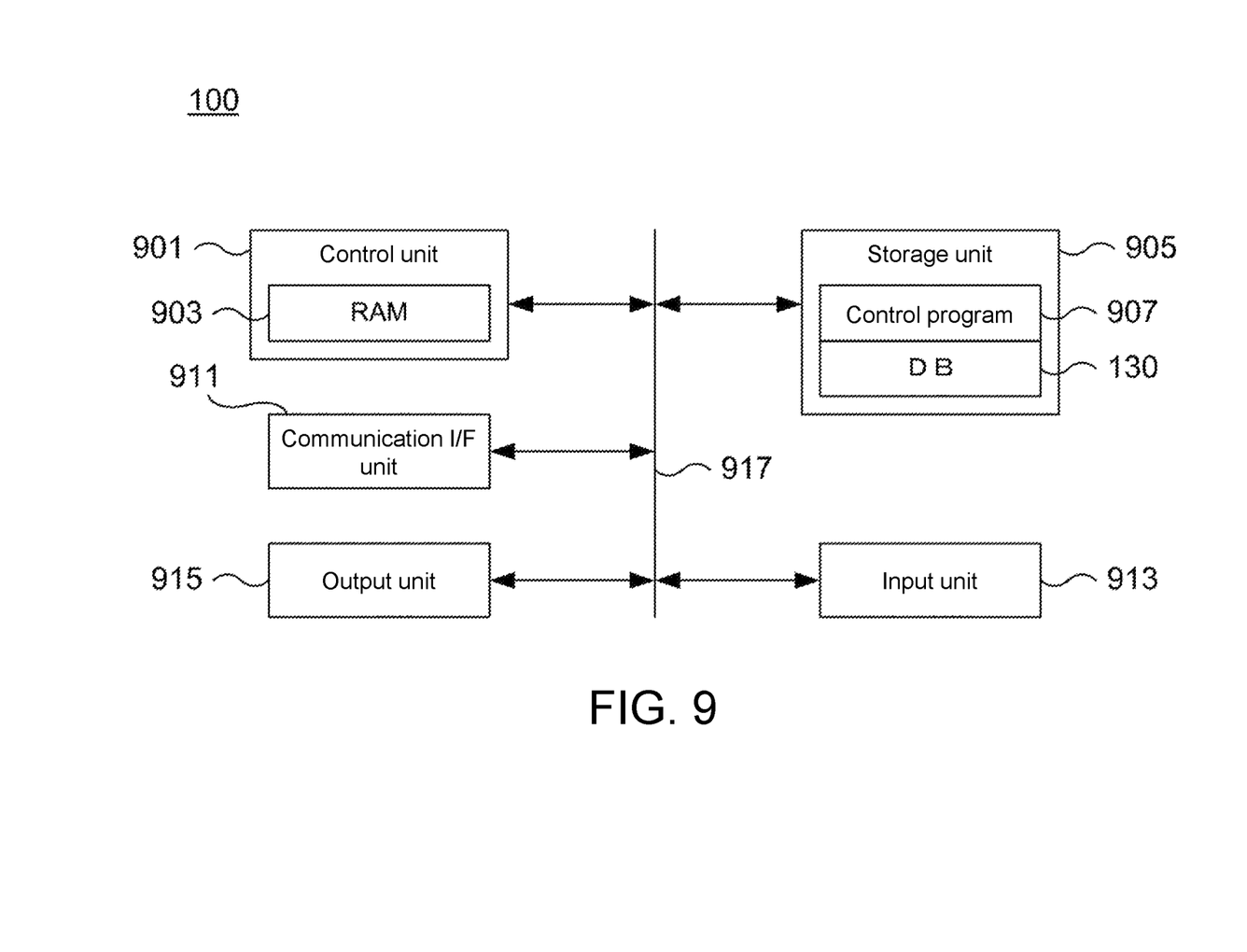
FIG. 9 is a flow chart illustrating an example of a processing procedure of the information processing device according to the embodiment.

Hereinafter, a hardware configuration capable of realizing the information processing device 100 will be described with reference to FIG. 9. FIG. 9 schematically illustrates an example of a hardware configuration of the information processing device 100 according to the present embodiment.

The information processing device 100 shown in the example of FIG. 9 includes a control unit 901, a storage unit 905, a communication interface (I/F) unit 911, an input unit 913, and an output unit 915, and each unit can be selected so as to be capable of communicating with each other through a bus line 917.

The control unit 901 includes a central processing unit (CPU), a random access memory (RAM) 903, a read only memory (ROM), and the like, and controls each component in accordance with information processing. More specifically, for example, the CPU included in the control unit 901 can execute the above-described various processes relating to the template generation unit 110 and the recognition unit 150 shown in FIG. 5 by reading a control program 907 from the storage unit 905 into the RAM 903 and executing the control program 907.

The storage unit 905 is an auxiliary storage device such as, for example, a hard disk drive (HDD) or a solid-state drive (SSD), and stores the control program 907, the database (DB) 130 and the like which are executed by the control unit 901. In the DB 130, as described above, it is possible to manage the two-dimensional template 131, the coordinate relationship information 133, or the like. Besides managing information such as camera parameters on the DB 130 can also be considered.

The control program 907 is a program for executing the processing of the information processing device 100 described with reference to FIGS. 1 to 8. Particularly, the configurations of the template generation unit 110 and the recognition unit 150 shown in FIG. 5 can be realized as the control program 907.

The communication I/F unit 911 is, for example, a communication module for communicating with another device in a wired or wireless manner. Communication systems used for the communication I/F unit 911 to communicate with another device are arbitrary, and examples thereof include a local area network (LAN), a universal serial bus (USB), and the like. For example, performing an operation such as outputting the three-dimensional position/posture information to an industrial robot (not shown) through the communication I/F unit 911 can be considered.

The input unit 913 is, for example, a device for accepting various input operations or the like from a user which are capable of being realized by a mouse, a keyboard, a touch panel, or the like. The output unit 915 is, for example, a device, such as a display or a speaker, for informing a user who uses the information processing device 100 of various types of information through display, sound or the like. For example, the output unit 915 displaying the recognition results of the recognition unit 150 for the position/posture of the container to inform a user of the effect can also be considered.

5 Effect According to Embodiment

As described above, the information processing device 100 according to the present embodiment generates, for example, the two-dimensional template which shows the shape of the upper edge of an object to be recognized for posture/position such as the container in advance, and then specifies the position of the container or the like by matching the captured image of an object to be recognized with the two-dimensional template. Although it is difficult to detect the three-dimensional coordinates of an object having a small width or an object formed of a specular light-reflective material, the position and posture of an object to be recognized such as the container are detected by performing a matching process alone on the two-dimensional image in the present embodiment, and thus it is possible to detect the posture/position of an object to be recognized with a high degree of accuracy.

In addition, particularly, in a case where a member that can have another member contained therein such as the container is an object to be recognized, the outward appearance of the object to be recognized when it is imaged changes depending on whether another member is contained, or the number of members contained, it is difficult to perform detection by matching based on an image of the whole container or the like. However, in the information processing device 100 according to the present embodiment, since detection is performed using the image of the upper edge of the container, it is possible to detect the posture/position of an object with a high degree of accuracy regardless of whether a member is contained inside or the like.

Further, in the information processing device 100 according to the present embodiment, since the position and posture of the container is detected on the basis of matching according to the two-dimensional information, it is possible to reduce the amount of calculation more than in a case where the position and posture of the container is detected using the three-dimensional information.

6 Addition

The embodiment described above is intended to facilitate understanding of the present invention, and is not to be interpreted as limiting the present invention. Elements and their arrangements, materials, conditions, shapes, sizes, and the like included in the embodiment are not limited to those exemplified and can be modified appropriately. In addition, components shown in different embodiments can be partially replaced or combined.

(Addition 1)

An information processing device (100) including:

a first input unit (111) that receives an input of three-dimensional model information for generating a three-dimensional model of an object to be recognized;

a template generation unit (110) that generates a two-dimensional template (131) which shows a shape of an upper edge of the object to be recognized on the basis of the three-dimensional model information;

a coordinate relationship identification unit (117) that generates coordinate relationship information (133) indicating a relationship between three-dimensional coordinates of the three-dimensional model and two-dimensional coordinates when the three-dimensional model is imaged;

a second input unit (151) that receives an input of a captured image obtained by capturing an image of the object to be recognized;

a matching unit (153) that matches the captured image with the two-dimensional template (131); and a recognition unit (157) that recognizes a three-dimensional position and posture of the object to be recognized by referencing the coordinate relationship information (133) with respect to the object to be recognized in the captured image which is detected according to two-dimensional matching results of the matching unit (153).

(Addition 2)

An information processing method including causing an information processing device (100) to perform:

a process of receiving an input of three-dimensional model information for generating a three-dimensional model of an object to be recognized;

a process of generating a two-dimensional template (131) according to an upper edge image which shows a shape of an upper edge of the object to be recognized on the basis of three-dimensional model information;

a process of generating coordinate relationship information (133) indicating a relationship between three-dimensional coordinates of the three-dimensional model and two-dimensional coordinates when the three-dimensional model is imaged;

a process of receiving an input of a captured image obtained by capturing an image of the object to be recognized;

a process of matching the captured image with the two-dimensional template (131); and a process of recognizing a three-dimensional position and posture of the object to be recognized by referencing the coordinate relationship information (133) with respect to the object to be recognized in the captured image which is detected according to two-dimensional matching results of the matching unit.

(Addition 3)

A program for causing an information processing device (100) to execute:

a process of receiving an input of three-dimensional model information for generating a three-dimensional model of an object to be recognized;

a process of generating a two-dimensional template (131) according to an upper edge image which shows a shape of an upper edge of the object to be recognized on the basis of three-dimensional model information;

a process of generating coordinate relationship information (133) indicating a relationship between three-dimensional coordinates of the three-dimensional model and two-dimensional coordinates when the three-dimensional model is imaged;

a process of receiving an input of a captured image obtained by capturing an image of the object to be recognized;

a process of matching the captured image with the two-dimensional template (131); and a process of recognizing a three-dimensional position and posture of the object to be recognized by referencing the coordinate relationship information (133) with respect to the object to be recognized in the captured image which is detected according to two-dimensional matching results of the matching unit.

REFERENCE SIGNS LIST

100 Information processing device
110 Template generation unit
111 Model input unit
113 Camera parameter input unit
115 Upper edge image generation unit
117 Coordinate relationship information generation unit
119 Output unit
130 Database (DB)
131 Two-dimensional template
133 Coordinate relationship information
150 Recognition unit
151 Luminance image input unit
153 Template matching unit
155 Feature point coordinate calculation unit
157 Three-dimensional position/posture calculation unit
159 Output unit
901 Control unit
905 Storage unit
907 Control program
911 Communication interface (I/F) unit
913 Input unit
915 Output unit
917 Bus line

The invention claimed is:

1. An information processing device, comprising:

a first input unit, configured to receive an input of a three-dimensional model information for generating a three-dimensional model of an object to be recognized;

a template generation unit, configured to generate a two-dimensional template which shows a shape of an upper edge of the object to be recognized on the basis of the three-dimensional model information;

a coordinate relationship identification unit, configured to generate a coordinate relationship information indicating a relationship between three-dimensional coordinates of the three-dimensional model and two-dimensional coordinates when the three-dimensional model is imaged;

a second input unit, configured to receive an input of a captured image obtained by capturing an image of the object to be recognized;

a matching unit, configured to match the captured image with the two-dimensional template; and a recognition unit, configured to recognize a three-dimensional position and posture of the object to be recognized by referencing the coordinate relationship information with respect to the object to be recognized in the captured image which is detected according to two-dimensional matching results of the matching unit.

2. An information processing method, comprising causing an information processing device to perform:

a process of receiving an input of three-dimensional model information for generating a three-dimensional model of an object to be recognized;

a process of generating a two-dimensional template which shows a shape of an upper edge of the object to be recognized on the basis of three-dimensional model information;

a process of generating coordinate relationship information indicating a relationship between three-dimensional coordinates of the three-dimensional model and two-dimensional coordinates when the three-dimensional model is imaged;

a process of receiving an input of a captured image obtained by capturing an image of the object to be recognized;

a process of matching the captured image with the two-dimensional template; and a process of recognizing a three-dimensional position and posture of the object to be recognized by referencing the coordinate relationship information with respect to the object to be recognized in the captured image which is detected according to two-dimensional matching results.

3. An information processing on-transitory computer readable medium, storing a program, for causing an information processing device to execute:

a process of receiving an input of three-dimensional model information for generating a three-dimensional model of an object to be recognized;

a process of generating a two-dimensional template which shows a shape of an upper edge of the object to be recognized on the basis of three-dimensional model information;

a process of generating coordinate relationship information indicating a relationship between three-dimensional coordinates of the three-dimensional model and two-dimensional coordinates when the three-dimensional model is imaged;

a process of receiving an input of a captured image obtained by capturing an image of the object to be recognized;

a process of matching the captured image with the two-dimensional template; and a process of recognizing a three-dimensional position and posture of the object to be recognized by referencing the coordinate relationship information with respect to the object to be recognized in the captured image which is detected according to two-dimensional matching results.

* * * * *